(12) United States Patent
Lin

(10) Patent No.: US 11,624,431 B2
(45) Date of Patent: Apr. 11, 2023

(54) LINEAR ACTUATOR AND CENTRIFUGAL SAFETY DEVICE THEREOF

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/719,984

(22) Filed: Apr. 13, 2022

(65) Prior Publication Data

US 2023/0047312 A1 Feb. 16, 2023

Related U.S. Application Data

(60) Provisional application No. 63/232,146, filed on Aug. 11, 2021.

(51) Int. Cl.
*F16D 59/00* (2006.01)
*F16H 25/24* (2006.01)
*F16H 25/20* (2006.01)

(52) U.S. Cl.
CPC ..... *F16H 25/2454* (2013.01); *F16H 25/2015* (2013.01); *F16H 2025/209* (2013.01); *F16H 2025/2031* (2013.01); *F16H 2025/2084* (2013.01); *F16H 2025/2463* (2013.01)

(58) Field of Classification Search
CPC ......... F16H 2025/2463; F16H 25/2015; F16H 25/2454; F16D 51/20; F16D 2127/002; F16D 59/02; F16D 59/00; F16D 51/60
See application file for complete search history.

(56) References Cited

U.S. PATENT DOCUMENTS

| 5,329,657 A | 7/1994 | Bartley et al. |
| 5,346,045 A | 9/1994 | Bennett et al. |
| 2012/0240696 A1 | 9/2012 | Bastholm et al. |
| 2022/0221035 A1* | 7/2022 | Schewe ................. A61G 7/018 |

* cited by examiner

*Primary Examiner* — Randell J Krug
(74) *Attorney, Agent, or Firm* — Chun-Ming Shih; HDLS IPR Services

(57) ABSTRACT

A linear actuator (1) and the centrifugal safety device (50) thereof is disclosed. The safety device (50) includes an outer socket (51) having a stop portion (512) and a first accommodation portion (513), an inner socket (53) having a raised portion (531) and a second accommodation portion (532) and a centrifugal assembly (55) having a centrifugal block (551) and an elastic element (555). The inner socket (53) drives the centrifugal assembly (55) to rotate. If the centrifugal force of the centrifugal block (551) is smaller than the elasticity of the elastic element (555), then the centrifugal block (551) is limited in the second accommodation portion (532) by the elastic element (555), or else the centrifugal block (551) moves into the first accommodation portion (513) and clamped by the raised portion (531) and the stop portion (512).

20 Claims, 15 Drawing Sheets

LINEAR ACTUATOR AND CENTRIFUGAL SAFETY DEVICE THEREOF

CROSS-REFERENCE TO RELATED APPLICATION

This patent application claims the benefit of U.S. Provisional Patent Application No. 63/232,146 filed Aug. 11, 2021, which is incorporated by reference herein.

BACKGROUND OF THE DISCLOSURE

Technical Field

The technical field relates to a linear actuator, and more particularly relates to the linear actuator and centrifugal safety device thereof.

Description of Prior Art

Linear actuators (or electric actuators) have been widely used and installed to different equipment such as electric hospital beds, treadmills, or wheelchairs to adjust the angle of elevation or the height or position of the equipment.

As disclosed in U.S. Pat. No. 5,329,657, a hospital bed includes an articulatable patient support with a fowler portion movable between horizontal and inclined positions relative to a frame of the bed. A reversible electric drive motor supports the frame of the bed and, through a reduction gearing arrangement and a releasible coupling mechanism, can rotatably drive a threaded shaft. A nut is engaged with the shaft and is held against rotation, and a linkage device couples the nut to the fowler portion to effect reciprocal movement of the fowler portion in response to reciprocal movement of the nut along the shaft. A manual release is provided on the fowler portion and, when actuated, disengages the releasible coupling mechanism, so that the threaded shaft is free to rotate independently of the motor and gearing arrangement.

As disclosed in U.S. Pat. No. 5,346,045, a linear actuator has reversible electric motors driving a screw-threaded shaft engaging a roller nut. A tubular housing attached to the nut has an internal seating member and load securing lugs at its remote end. A hydraulic shock absorber unit, providing linear deceleration, is normally held in its most relaxed condition between the seating member and an end of a spacer tube butting against the nut. When the nut is within the shock absorber stroke distance of the driven end of the shaft, the free end of the shaft compresses the shock absorber unit against the seating. When the nut is within shock absorber stroke distance of the free end of the shaft, a ring engages a stop collar, thereby holding the shock absorber body at a fixed distance from the free end of the shaft, and the spacer tube compresses the shock absorber unit. A centrifugal brake is provided on a drive coupling pulley, and restrains rotation of the shaft above a predetermined rate.

As disclosed in U.S. Pat. Publication No. US2012240696A1, a linear actuator with a reversible electric motor, which over a transmission drives a non-self-locking spindle by which a tube-shaped positioning element can be moved axially, in that it with one end is connected to a spindle nut on a spindle. The actuator has a quick release for releasing the tube-shaped positioning element from the electric motor and the part of the transmission that lies from the motor to the quick release such that the spindle is set to rotate by the load on the tube-shaped positioning element. The actuator further has braking means for controlling the speed of the tube-shaped positioning element during the outer load, when the quick release is activated. The braking means consists of a centrifugal brake, by which it is possible to provide a construction where the lowering speed is self-controlled when the quick release is activated.

SUMMARY OF THE DISCLOSURE

It is a primary objective of this disclosure to provide a linear actuator that uses a centrifugal safety device to reduce the impact force of a telescopic tube when the telescopic tube is quickly retracted into an outer tube.

To achieve the aforementioned objective, this disclosure discloses a linear actuator including an actuation body, a quick release mechanism and a centrifugal safety device. The actuation body includes an electric motor, a lead screw, an outer tube, and a telescopic tube. The lead screw is driven by the electric motor to rotate; the outer tube is adapted to sheathe the telescopic tube, and the telescopic tube is screwed and transmitted with the lead screw. The centrifugal safety device is adapted to sheathe the lead screw and includes an outer socket, an inner socket and a centrifugal assembly, and the outer socket has a cavity, at least one stop portion disposed in the cavity, and a first accommodation portion formed at a side edge of the stop portion. The inner socket is installed in the outer socket, and having at least one raised portion extended from an outer peripheral surface of the inner socket, and a second accommodation portion formed at a side edge of the raised portion. The centrifugal assembly includes at least one centrifugal block and at least one elastic element, and the centrifugal block is movably installed between the first accommodation portion and the second accommodation portion. The lead screw drives the inner socket and the centrifugal assembly to rotate, and when the centrifugal force of the centrifugal block is smaller than the elastic force of the elastic element, the centrifugal block is limited in the second accommodation portion by the elastic element, and the inner socket rotates in the outer socket; and when the centrifugal force of the centrifugal block is greater than the elastic force of the elastic element, the centrifugal block moves into the first accommodation portion and clamped by the raised portion and the stop portion, and the inner socket is linked with the outer socket.

Another objective of this disclosure is to provide a centrifugal safety device that can prevent speed loss during operation, thereby improving the safety of use.

To achieve the aforementioned objectives, this disclosure discloses a centrifugal safety device including an outer socket, an inner socket, and a centrifugal assembly. The outer socket has a cavity, at least one stop portion disposed in the cavity, and a first accommodation portion formed at a side edge of the stop portion. The inner socket is disposed in the outer socket and has at least one raised portion extended from an outer peripheral surface of the inner socket, and a second accommodation portion formed at a side edge of the raised portion. The centrifugal assembly includes at least one centrifugal block and at least one elastic element, and the centrifugal block is movably disposed between the first accommodation portion and the second accommodation portion. The inner socket drives the centrifugal assembly to rotate, and when the centrifugal force of the centrifugal block is a smaller than the elastic force of the elastic element, the centrifugal block is limited in the second accommodation portion by the elastic element, and the inner socket rotates in the outer socket; when the centrifugal force of the centrifugal block is greater than the elastic force of the elastic element, the centrifugal block moves into the first accommodation portion and clamped by the raised portion and the stop portion, and the inner socket and the outer socket are linked with each other.

This disclosure also has the following effects. With the centrifugal safety device, the overall structure of the linear actuator may be made more compact. The centrifugal safety device may be installed on the hospital bed under the basic structure of the original linear actuator, thereby shortening the required development time reducing the cost for molds.

BRIEF DESCRIPTION OF THE DRAWINGS

The technical characteristics of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

With reference to FIGS. 1 to 11 for a linear actuator and a centrifugal safety device thereof in accordance with this disclosure, the linear actuator 1 includes an actuation body 10, a quick release mechanism (or release mechanism) 30 and a centrifugal safety device 50.

Figure 1:
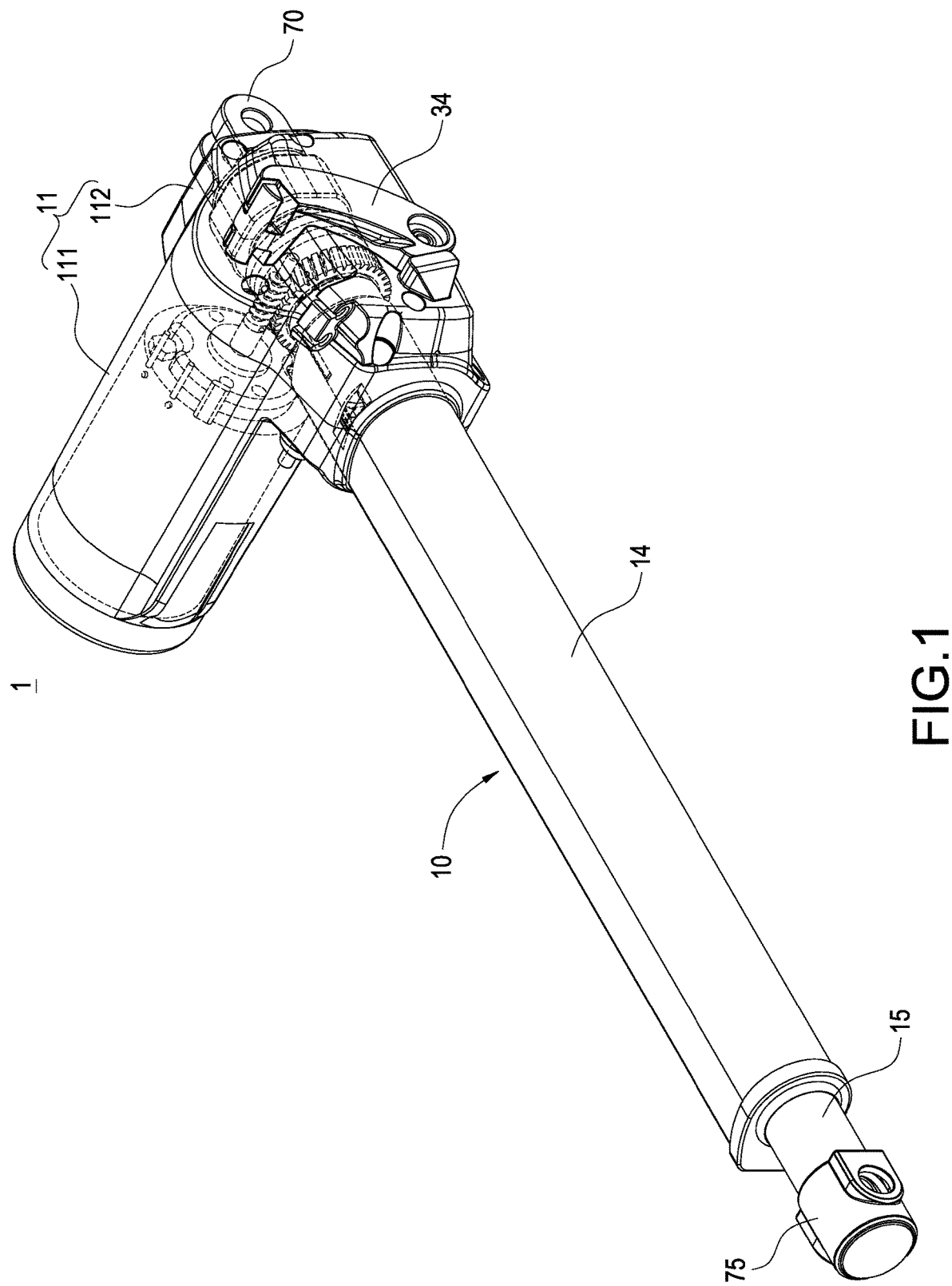
FIG. 1 is a perspective view of a linear actuator of this disclosure.
Figure 2:
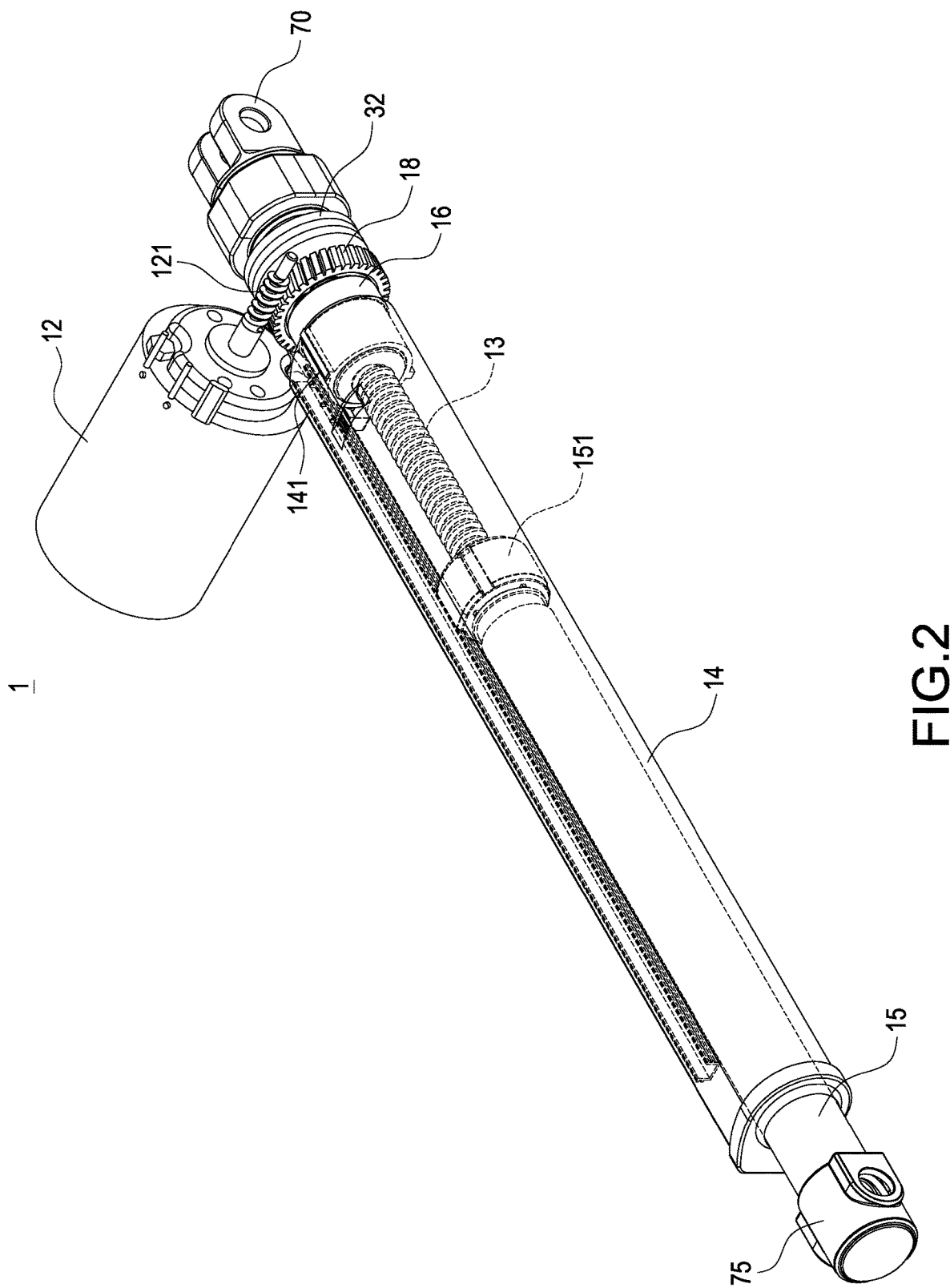
FIG. 2 is a perspective view of an actuation body of this disclosure.
Figure 3:
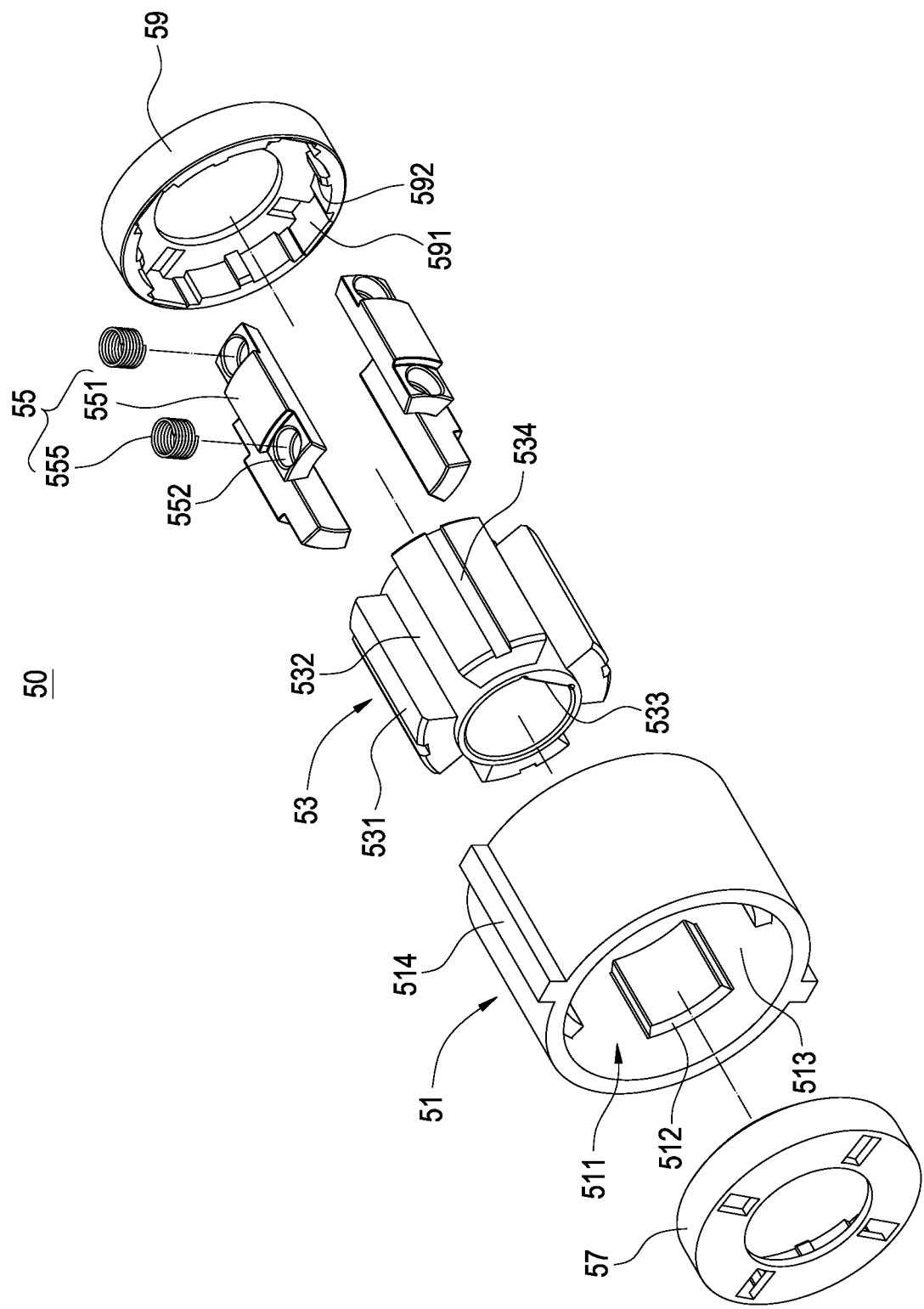
FIG. 3 is an exploded view of a centrifugal safety device of this disclosure.
Figure 4:
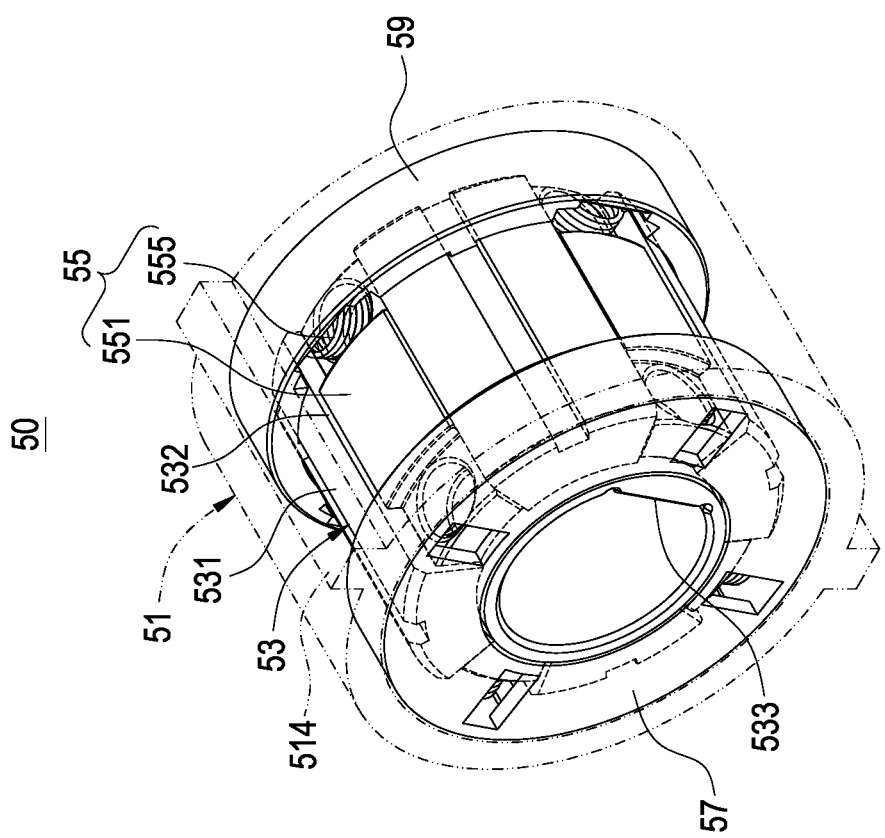
FIG. 4 is a perspective view of a centrifugal safety device of this disclosure.

In FIGS. 1 and 2, the actuation body 10 includes a casing 11, an electric motor 12, a lead screw 13, an outer tube 14 and a telescopic tube 15.

The casing 11 includes a lower casing 111 and an upper casing 112 covering onto and engaged with the lower casing 111. The electric motor 12 is installed in the lower casing 11 and has a worm screw 121, and the electric motor 12 rotates the worm screw 121 in a forward or reverse direction through the operation of internal magnetic poles, coils, and currents.

Figure 6:
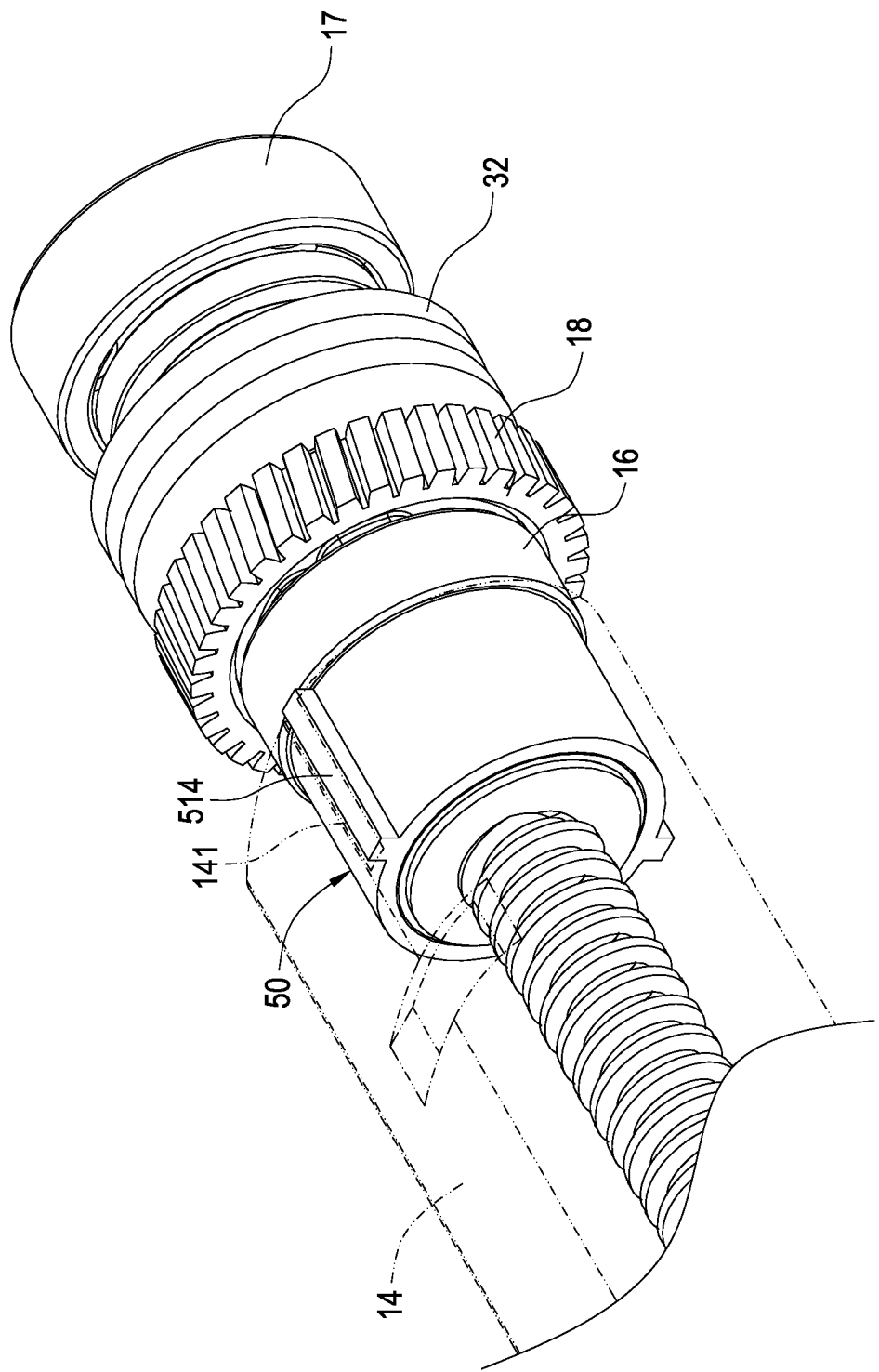
FIG. 6 is a perspective view showing a lead screw, an outer tube, and a centrifugal safety device in accordance with this disclosure.
Figure 7:
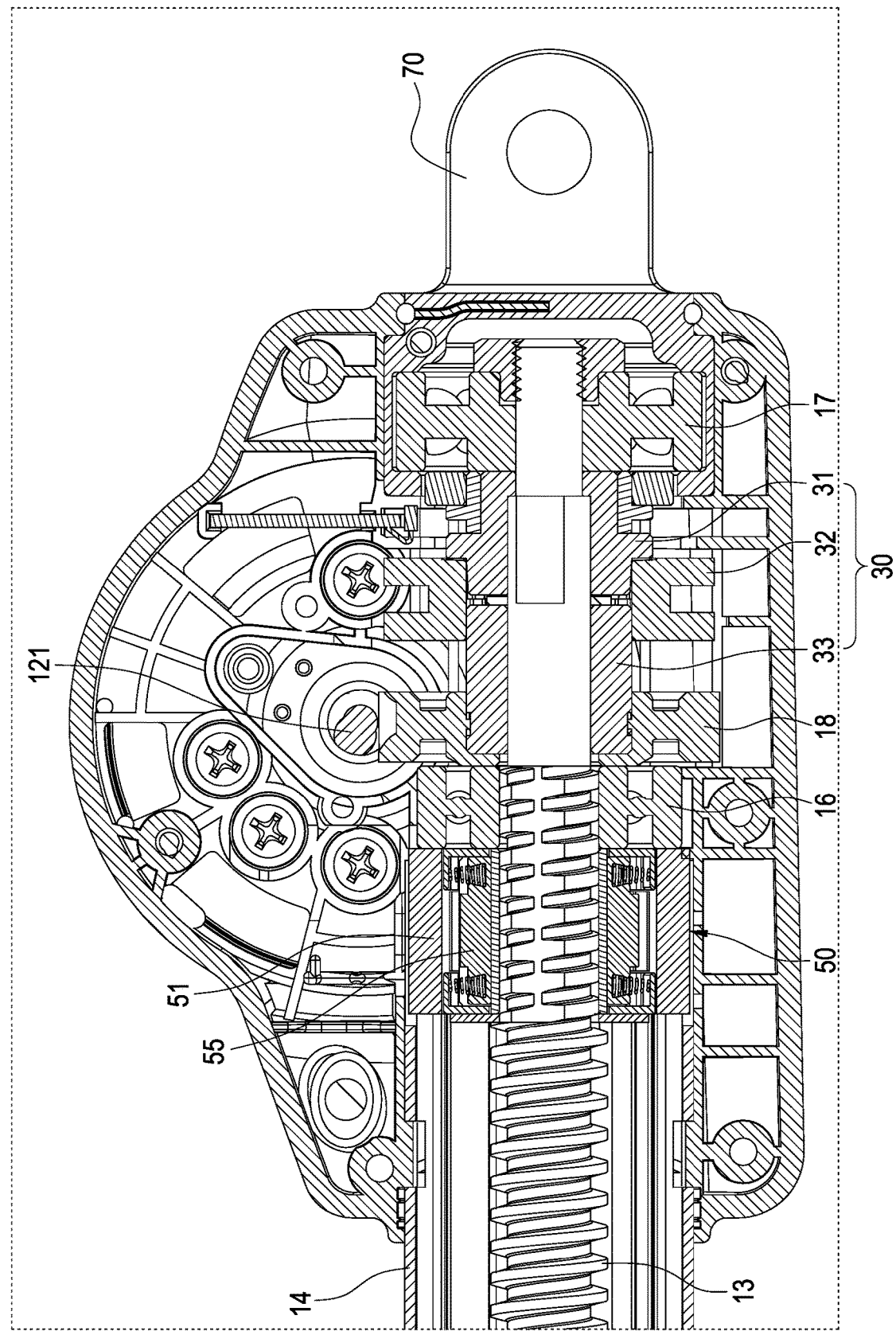
FIG. 7 is a cross-sectional view showing a lead screw, an outer tube, and a centrifugal safety device in accordance with this disclosure.
Figure 8:
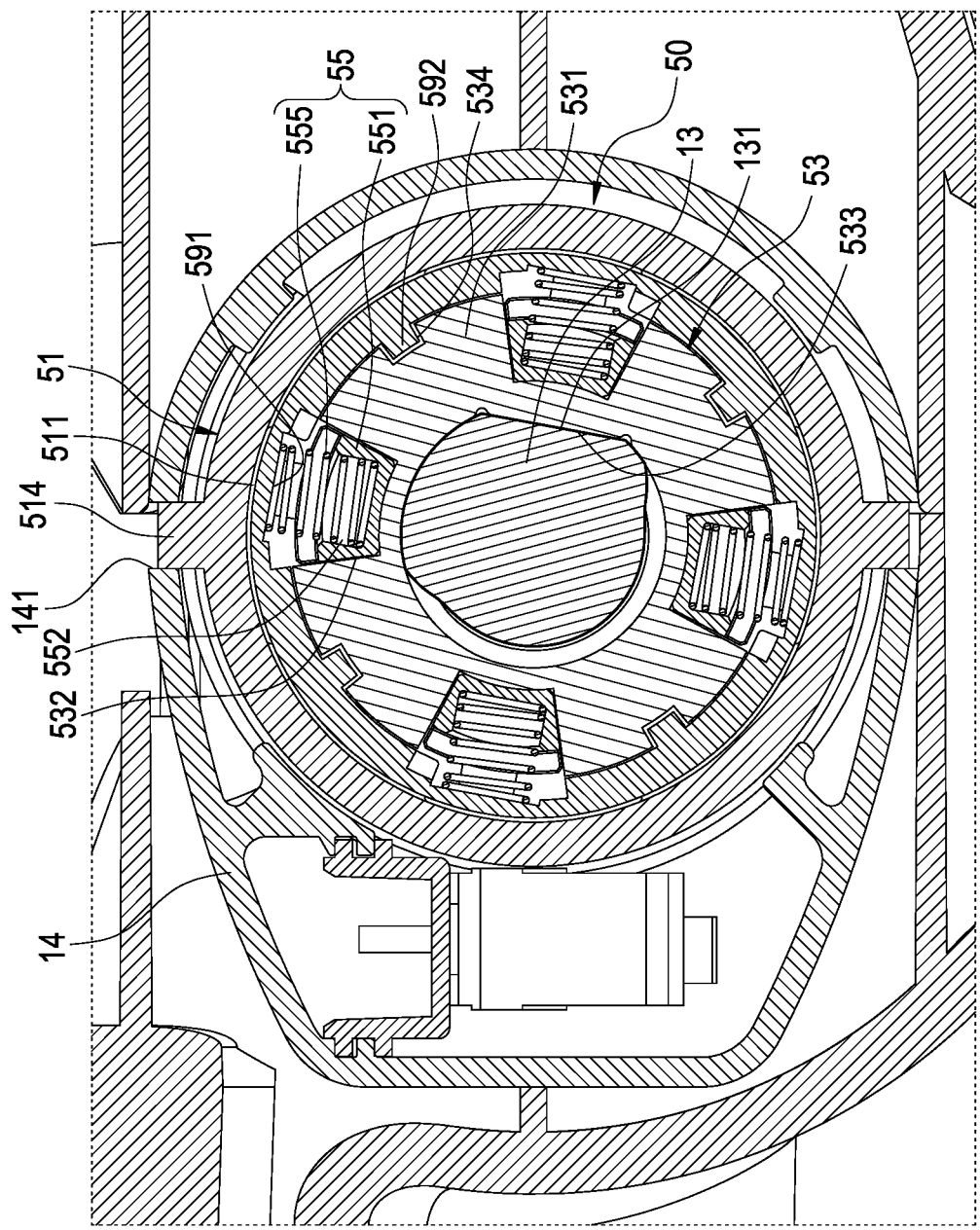
FIG. 8 is another cross-sectional view showing a lead screw, an outer tube, and a centrifugal safety device in accordance with this disclosure.

In FIGS. 6 and 7, the lead screw 13 is supported by a front bearing 16 and a rear bearing 17, such that the rear section of the lead screw 13 is formed in the upper casing 112, and the remaining portion of the lead screw 13 protrudes out of the casing 11, and a worm gear 18 engaged with the worm screw 121 sheathes on the lead screw 13 disposed on the rear side of front bearing 16. In this embodiment, the lead screw 13 is a non-self-locking lead screw. In other words, when the telescopic tube 15 is limited from producing a rotation, the lead screw 13 may be rotated freely relative to the telescopic tube 15 to produce a linear displacement of the telescopic tube 15 under the effect of an axial thrust or pressure exerted on the telescopic tube 15.

The outer tube 14 sheathes the lead screw 13 along the outer periphery, and an end of the outer tube 14 is covered and fixed jointly by the lower casing 111 and the upper casing 112. A nut 151 is connected to an end of the telescopic tube 15 (as shown in FIG. 2), the telescopic tube 15 sheathes the outer periphery of the lead screw 13 and screwed with the lead screw 13 through the nut 151 for transmission.

In FIG. 7, the quick release mechanism 30 includes a positioning gear 31 and a clutch gear 32, and the positioning gear 31 sheathes and is fixed to the lead screw 13, such that the positioning gear 31 is rotated with the lead screw 13, and the clutch gear 32 sheathes the lead screw 13 through a guide element 33 and is formed at a side edge of the positioning gear 31, and the clutch gear 32 may axially move on the guide element 33. The lead screw 13 is driven through the engagement of the worm screw 121 of the electric motor 12 with the worm gear 18, so that when the clutch gear 32 and the positioning gear 31 are engaged with each other, the positioning gear 31 and the clutch gear 32 are driven by the lead screw 13 to rotate. When the clutch gear 32 and the positioning gear 31 are separated from each other, the telescopic tube 15 is driven by the lead screw 13 under the effect of the thrust to produce free rotations.

The positioning gear 31 and the clutch gear 32 are substantially cylindrical bodies, and have a plurality of convex keys and a plurality of key slots, and each convex key is embedded in each key slot (not shown in the figures), so that the clutch gear 32 is operable to produce an engagement or a disengage with respect to the positioning gear 31.

In FIGS. 1 and 7, the quick release mechanism 30 of this embodiment further includes a wrench assembly 34, and the wrench assembly 34 includes a wrench handle (not labelled) having an end pivotally connected to the outside of the upper casing 112 and installed by a bolt. By the operation of the wrench handle, the clutch gear 32 and the positioning gear 31 may be connected or detached relative to each other.

When the clutch gear 32 and the positioning gear 31 are connected, the lead screw 13, the positioning gear 31, the clutch gear 32, the guide element 33 and the worm gear 18 rotate altogether. When the clutch gear 32 and the positioning gear 31 are detached, the lead screw 13 and the positioning gear 31 rotate together, but the clutch gear 32, the guide element 33 and the worm gear 18 do not rotate.

In FIGS. 3 to 6, the centrifugal safety device 50 of this embodiment sheathes the lead screw 13 and is formed at a side edge of the quick release mechanism 30, and the centrifugal safety device 50 of this embodiment is disposed at a position on the front side of the front bearing 16 and includes an outer socket 51, an inner socket 53 and a centrifugal assembly 55.

In this embodiment, the outer socket 51 is a cylindrical body and has a cavity 511. A plurality of stop portions 512 is disposed in the cavity 511 and extended radially adjacent to the axis of the cavity 511, and each stop portion 512 includes, but not limited to, a stop block, and the stop portions 512 are configured to be equidistant from one another, and a first accommodation portion 513 is formed between any two adjacent stop portions 512, and each first accommodation portion 513 includes, but not limited to, a groove. In addition, two positioning bars 514 are extended in a radial direction away from the axis of the outer peripheral surface of the outer socket 51, and the outer tube 14 has a positioning slot 141 for embedding and fixing each positioning bar 514. In addition, there may be one stop portion 512 only, and the first accommodation portion 513 is formed at a side edge of the stop portion 512.

Figure 5:
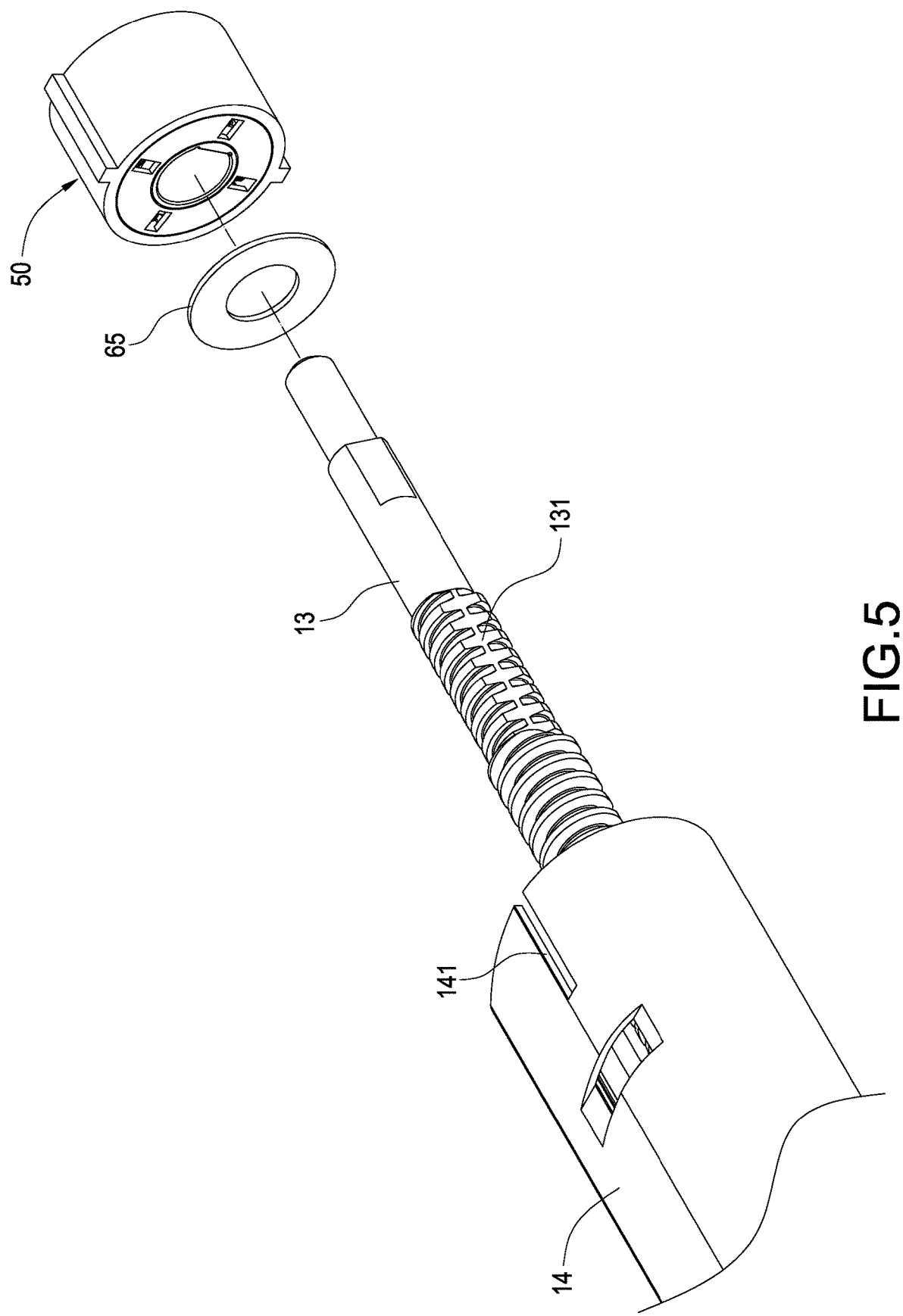
FIG. 5 is an exploded view showing a lead screw, an outer tube, and a centrifugal safety device in accordance with this disclosure.

In this embodiment, the inner socket 53 is also a cylindrical body installed in the outer socket 51 and having a plurality of raised portions 531. The raised portions 531 are disposed on an outer peripheral surface of the inner socket 53 and extended in a radial direction away from the axis of the inner socket 53, and each raised portion 531 includes, but not limited to, a rib, and the raised portions 531 are configured to be equidistant from one another, and a second accommodation portion 532 is formed between any two adjacent raised portion 531, and each second accommodation portion 532 includes, but not limited to, a groove. In addition, a snap slot 534 is formed at a middle position of each raised portion 531, and the inner socket 53 has a positioning plane 533 matched with the positioning plane 131 of the lead screw 13 (as shown in FIG. 5). In addition, the quantity of raised portions 531 and the quantity of second accommodation portions 532 are designed to be corresponsive to the quantity of stop portions 512 and the quantity of first accommodation portions 513.

There may be one centrifugal assembly 55, or a plurality of centrifugal assemblies 55 as adopted in this embodiment, and the centrifugal assemblies 55 are movably installed between the first accommodation portion 513 and the second accommodation portion 532. In this embodiment, each centrifugal assembly 55 includes a centrifugal block 551 and two elastic elements 555, and the centrifugal block 551 has an axial cross-section substantially in a stepped shape, and two ends of the centrifugal block 551 have a thickness smaller than the thickness of the middle section, and the two ends of the centrifugal block 551 separately have a blind hole 552. The elastic element 555 of this embodiment is a compression spring, and a partial area of each elastic element 555 is accommodated in the blind hole 552, and another partial area is protruded out from the blind hole 552. In addition, there may be one elastic element 555, and each centrifugal assembly 55 may be formed by a plurality of centrifugal blocks 551 and an elastic element 555 (not shown in the figures).

In this embodiment, the centrifugal safety device 50 further includes a front cap 57 and a rear cap 59 covering the head and tail ends of the inner socket 53 and each centrifugal assembly 55 respectively, and a flat attaching surface 591 is formed in the rear cap 59 and provided for pressing and attaching an end of each elastic element 555, and a snap bar 592 is extended in the rear cap 59 and embedded in each respective snap slot 534. Similarly, the front cap 57 also has the aforementioned flat attaching surface and snap bar (not shown in the figures).

In an embodiment, the inner socket 53 of the centrifugal safety device 50 sheathes the lead screw 13, and a gasket 65 is installed to a side edge of the front cap 57 for balancing the force exerted onto the centrifugal safety device 50.

In an embodiment of this disclosure as shown in FIGS. 1 and 2, the linear actuator 1 further includes a rear support base 70 and a front support base 75, and the rear support base 70 sheathes the rear bearing 17 and is fixed by the upper casing 112 and the lower casing 111, and the front support base 75 sheathes an end of the telescopic tube 15 away from the nut 151.

During operation, the rear support base 70 and the front support base 75 are fixed on an electric hospital bed (not shown in the figures), and the worm gear 18 is driven to rotate by the rotation of the worm screw 121, and the lead screw 13 is driven by the worm gear 18. Since the telescopic tube 15 is limited by the outer tube 14, the telescopic tube 15 moves linearly in the axial direction relative to the lead screw 13 during the rotation of the lead screw 13, thereby causing the front section of the electric hospital bed to produce a lifting motion.

Figure 9:
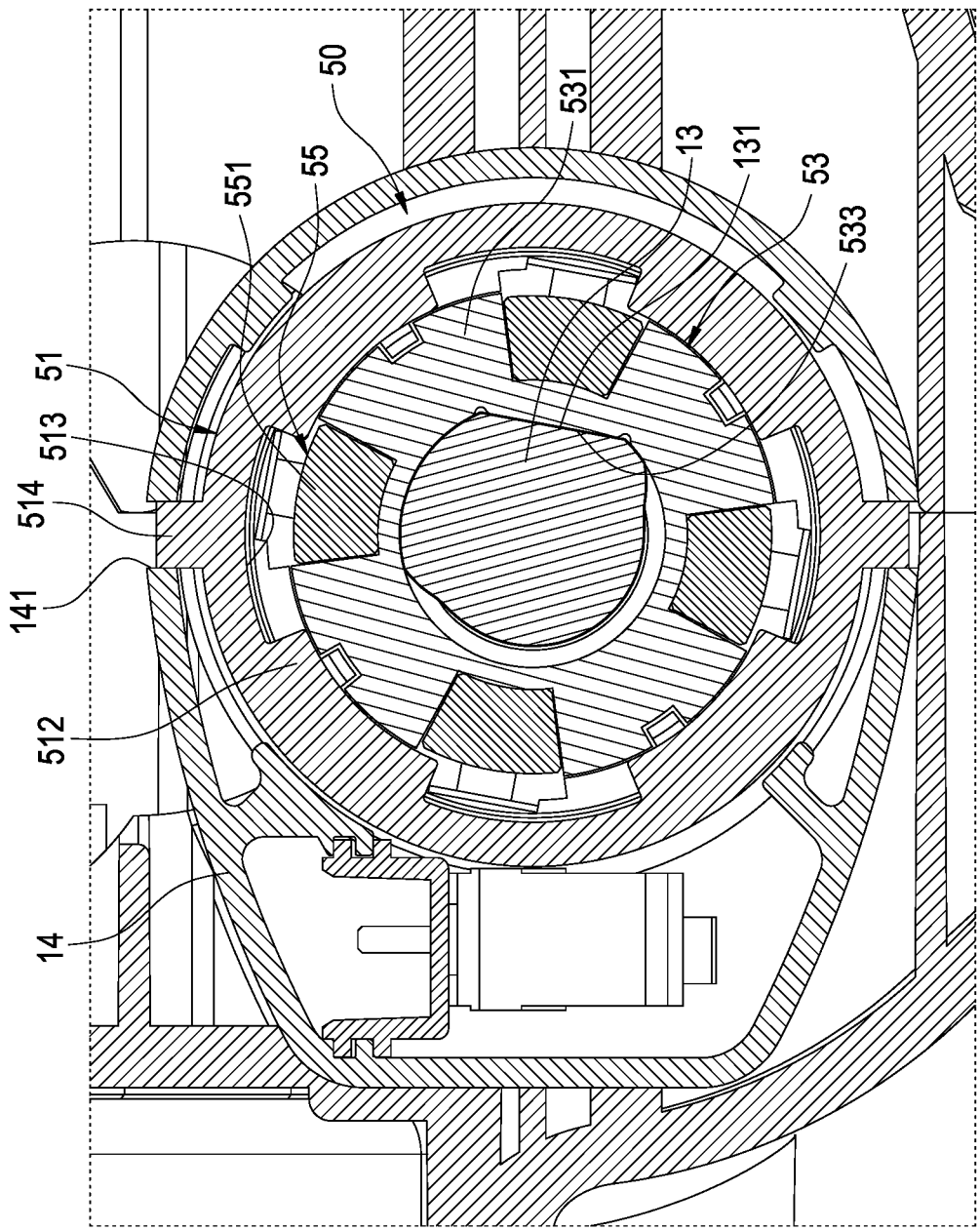
FIG. 9 is a first cross-sectional view showing a using status of a lead screw, an outer tube, and a centrifugal safety device in accordance with this disclosure.
Figure 10:
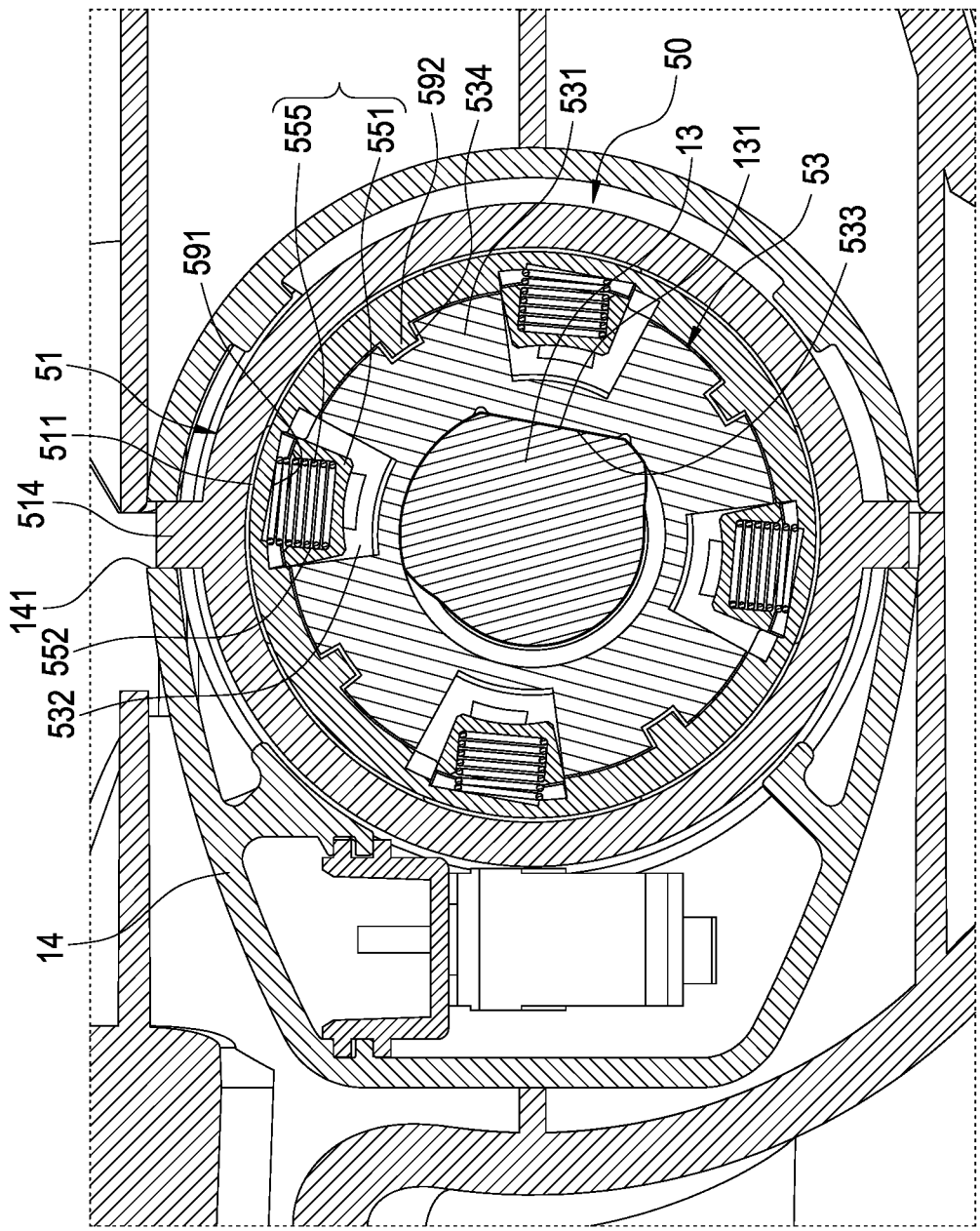
FIG. 10 is a second cross-sectional view showing a using status of a lead screw, an outer tube, and a centrifugal safety device in accordance with this disclosure.

In FIGS. 8 to 11, when a patient has to lie down to have an electric shock or other treatments during an emergency, the clutch gear 32 and the positioning gear 31 are separated from each other by the rotation of the wrench assembly 34. The patient's body weight or a force applied by a medical staff to the front section of the electric hospital bed is used to produce a quick rotation of the lead screw 13 after the telescopic tube 15 receives the aforementioned forces, such that the lead screw 13 rotates quickly and retracted into the outer tube 14, and the inner socket 53 is driven by the lead screw 13 to rotate with the centrifugal assembly 55 when the centrifugal force of the centrifugal block 551 is smaller than the elastic force of the elastic element 555, and the centrifugal block 551 is limited in the second accommodation portion 532 by the elastic element 555, so that the inner socket 53 may rotate freely in the outer socket 51 (as shown in FIG. 9).

Figure 11:
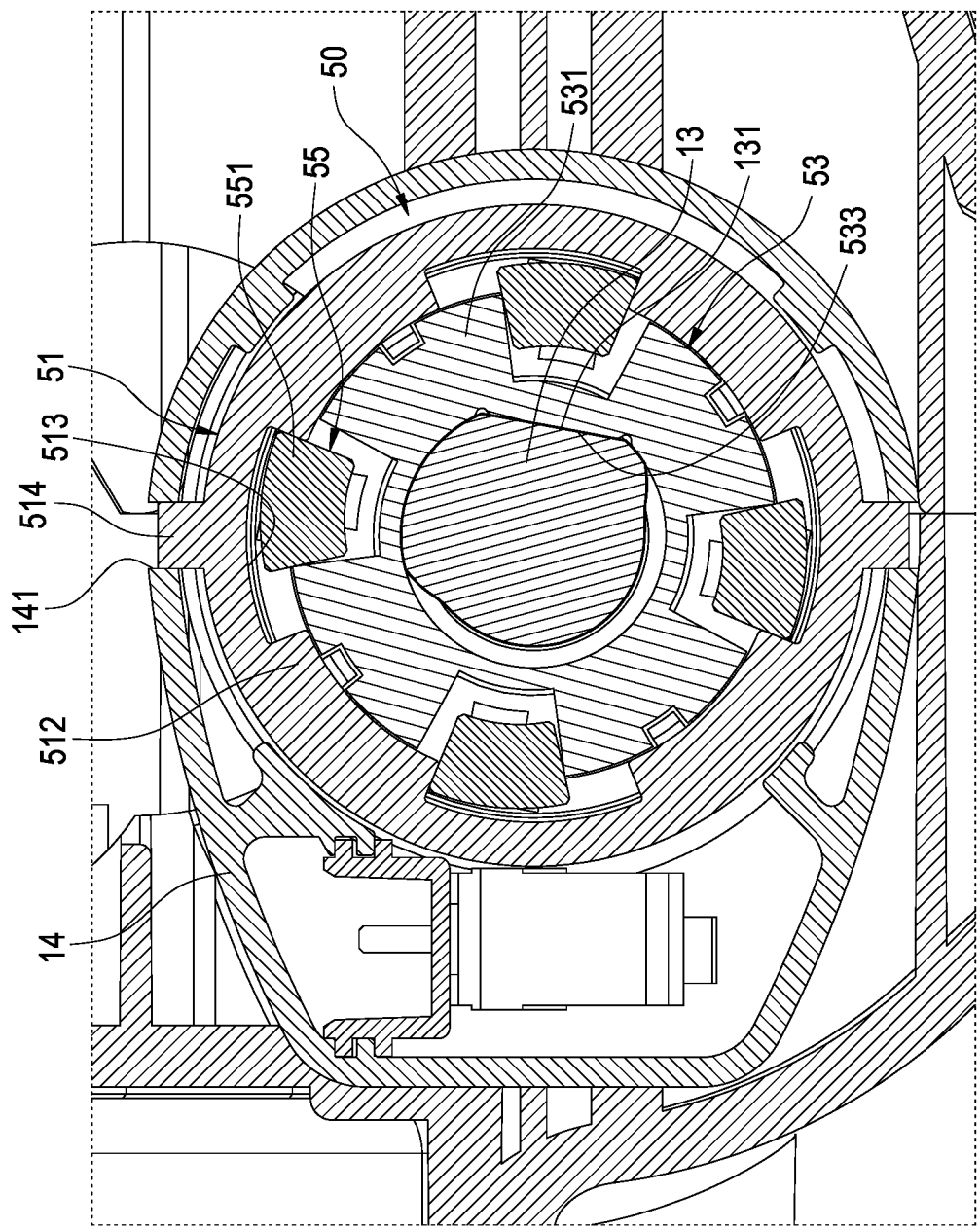
FIG. 11 is a third cross-sectional view showing a using status of a lead screw, an outer tube, and a centrifugal safety device in accordance with this disclosure.

When the rotating centrifugal block 551 has a centrifugal force greater than the elastic force of the elastic element 555, a portion of the centrifugal block 551 moves into the first accommodation portion 513 and clamped by the raised portion 531 and the stop portion 512, such that the inner socket 53 and the outer socket 51 are linked, and the inner socket 53 and the outer socket 51 of this embodiment rotate together (as shown in FIG. 11). By embedding and fixing each positioning bar 514 into each positioning slot 141, the rotation of the inner socket 53 is stopped by the outer socket 51 under the situation of the outer socket 51 remaining still. In this way, the centrifugal safety device 50 may absorb the impact force of the telescopic tube 15 when the speed drops rapidly, thereby reducing the possibility of hurting the patients and improving the comfort of use.

In addition to the application of the centrifugal safety device 50 used in the aforementioned linear actuator 1, the centrifugal safety device 50 of this embodiment may also be used in various other fields such as a turbine shaved teeth gear or a fractured motor shaft, and this device has the effects of preventing speed loss during operation and effectively acting as a safety protection mechanism.

Figure 12:
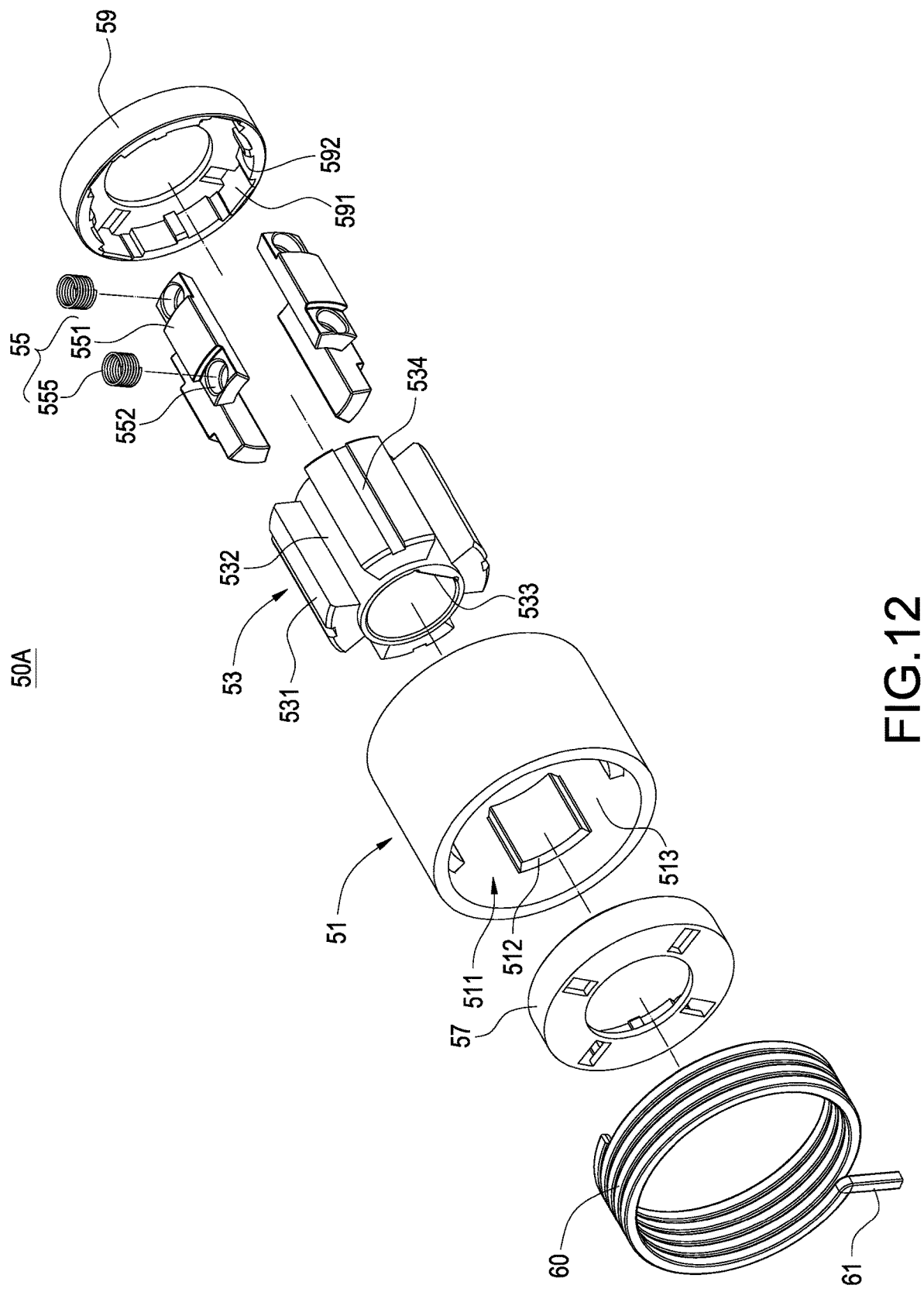
FIG. 12 is an exploded view of a centrifugal safety device in accordance with another embodiment of this disclosure.
Figure 13:
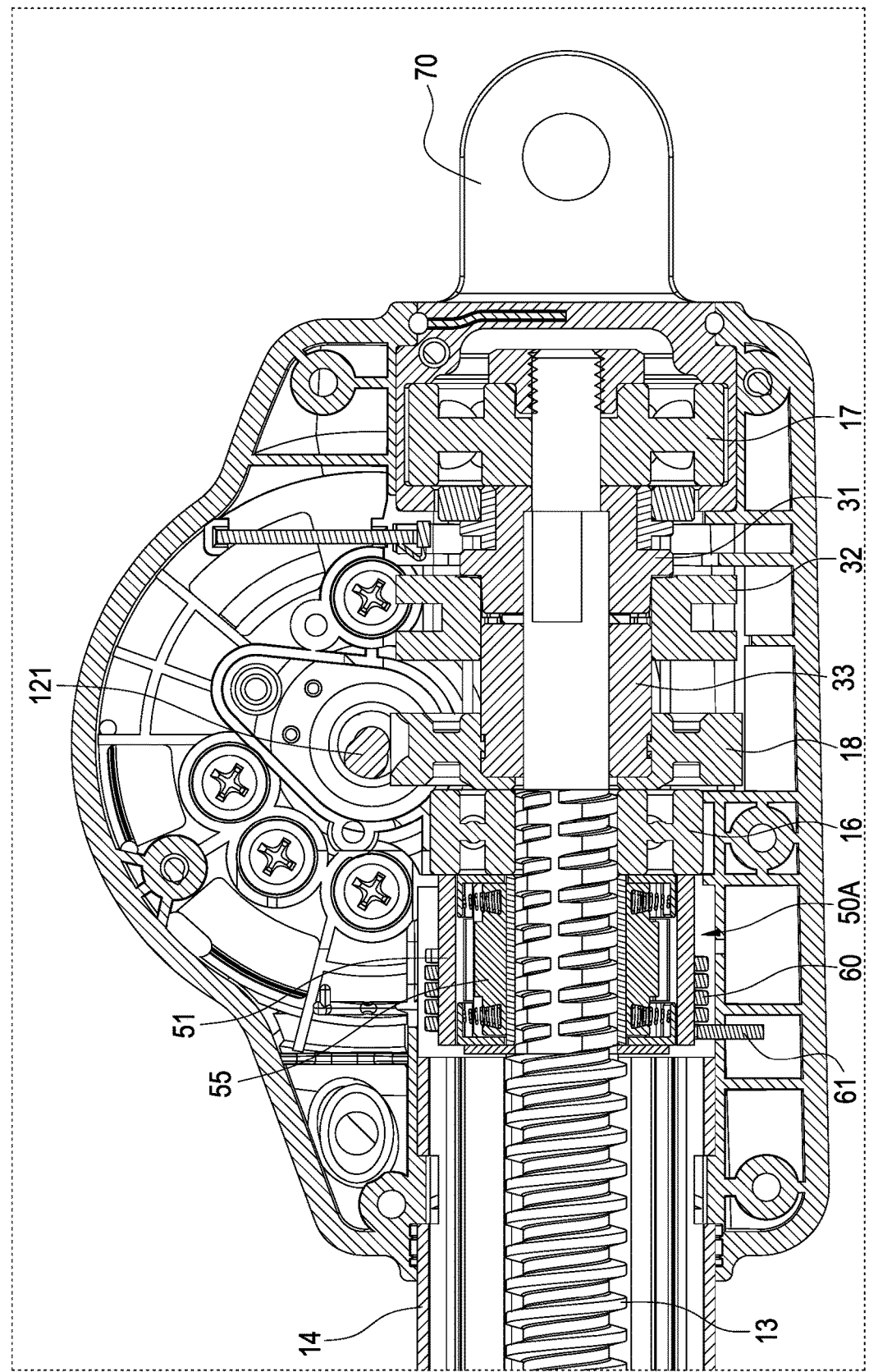
FIG. 13 is a cross-sectional view of a centrifugal safety device applied to a linear actuator in accordance with this disclosure.

In addition to the technical characteristics of the aforementioned embodiment, the centrifugal safety device 50A of this embodiment as shown in FIGS. 12 and 13 further includes a retarding spring 60 that tightly binds an outer peripheral surface of the outer socket 51, and the retarding spring 60 has a positioning arm 61 extended outwardly and provided for fixing to the casing 11. When the centrifugal safety device 50A is installed to the linear actuator 1, the inner socket 53 sheathes the lead screw 13, and the positioning plane 131 and the positioning plane 533 are attached to each other (as shown in FIG. 11), so that the lead screw 13 drives the inner socket 53 to rotate, and a portion of the centrifugal block 551 moves into the first accommodation portion 513 and is clamped by the raised portion 531 and the stop portion 512, such that when the inner socket 53 and the outer socket 51 rotate together, a friction is formed between the inner peripheral surface of the retarding spring 60 and the outer peripheral surface of the outer socket 51, and the retarding spring 60 is provided to achieve the effect of braking and retarding the outer socket 51.

Figure 14:
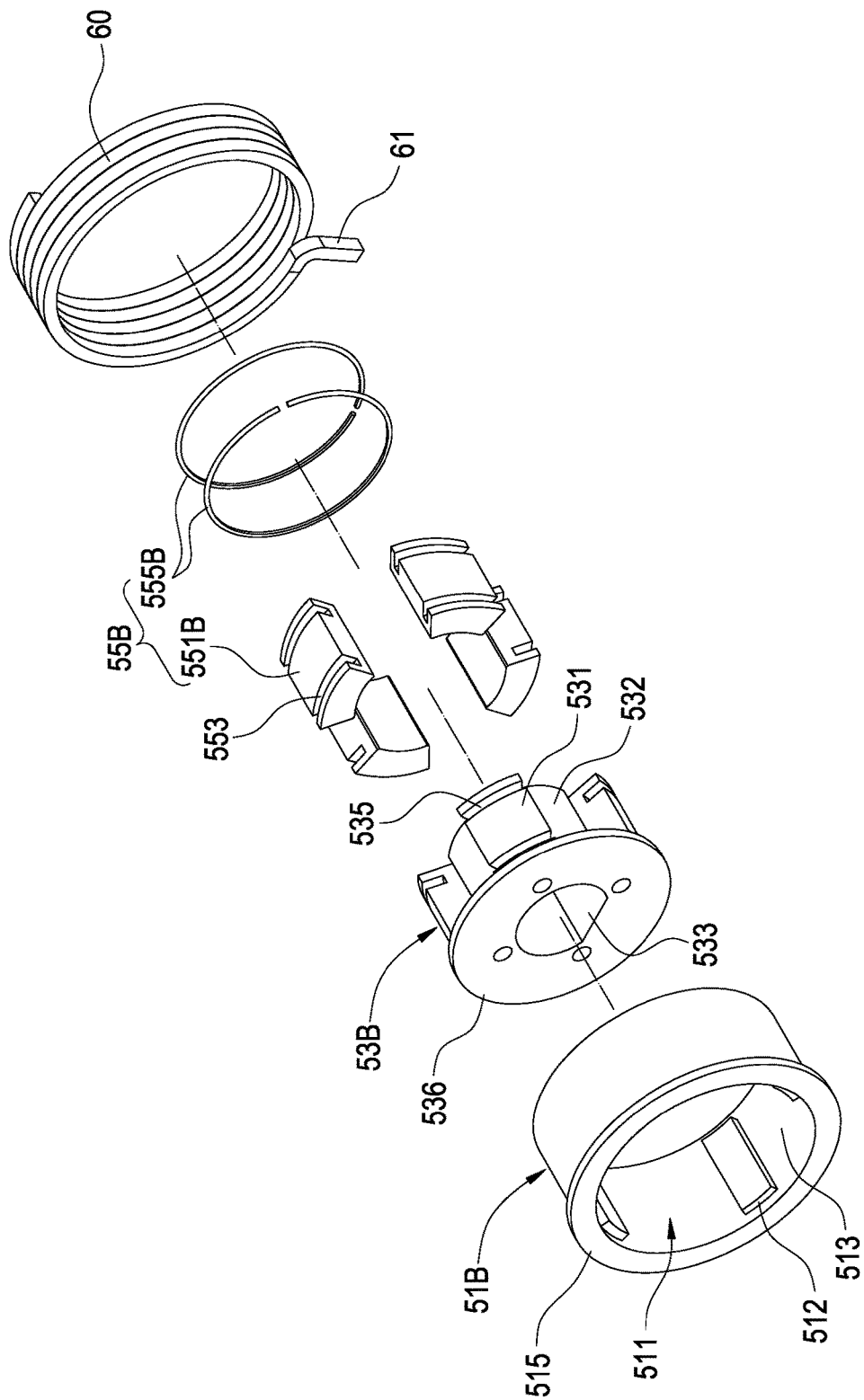
FIG. 14 is an exploded view of a centrifugal safety device in accordance with another embodiment of this disclosure.
Figure 15:
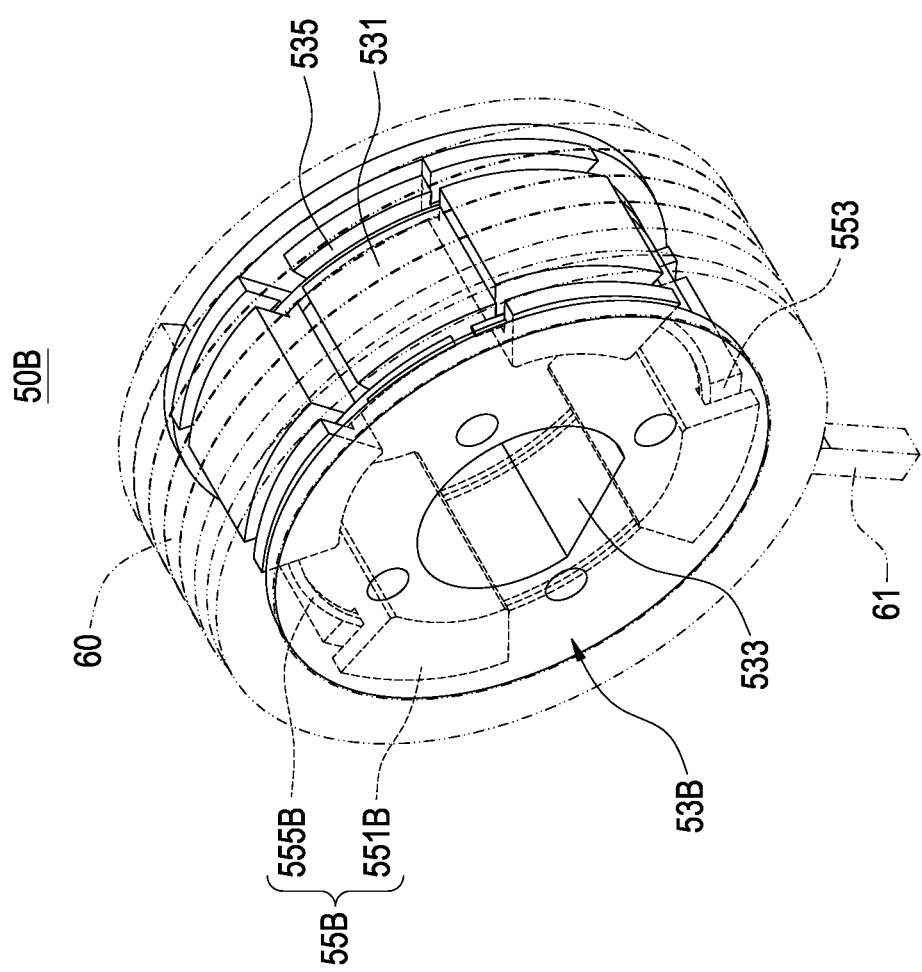
FIG. 15 is a perspective view of a centrifugal safety device in accordance with another embodiment of this disclosure.

In FIGS. 14 and 15, the difference between the centrifugal safety device 50B of this embodiment and the centrifugal safety devices 50, 50A resides on that a convex ring 515 is expanded and extended from a distal edge of the outer socket 51B, and each raised portion 531 of the inner socket 53B has two radial embedding grooves 535, and a convex ring 536 is expanded and extended from a distal edge of the inner socket 53B, and a positioning plane 533 is formed in the inner socket 53B and attached to the positioning plane 131 of the lead screw 13. Each centrifugal block 551B of the centrifugal assembly 55B also has two radial embedding grooves 553, and the elastic element 555B of this embodiment is a C-ring, and each elastic element 555B is engaged with each radial embedding groove 535, 553. The retarding spring 60 tightly binds the outer peripheral surface of the outer socket 51B and attaches to a side edge of the convex ring 515.

In summation of the description above, the linear actuator and its centrifugal safety devices in accordance with this disclosure may achieve the expected effects and overcome the drawbacks of the prior art, and also comply with the patent application requirements, and thus this disclosure is duly filed for patent application.

While this disclosure has been described by means of specific embodiments, numerous modifications and variations could be made thereto by those skilled in the art without departing from the scope and spirit of this disclosure set forth in the claims.

What is claimed is:

1. A linear actuator (1), comprising:
    an actuation body (10), comprising an electric motor (12), a lead screw (13), an outer tube (14) and a telescopic tube (15), and the lead screw (13) being driven by the electric motor (12) to rotate, and the outer tube (14) adapted to sheathe the telescopic tube (15), and the telescopic tube (15) screwed and transmitted with the lead screw (13);
    a release mechanism (30), adapted to sheathe the lead screw (13); and
    a centrifugal safety device (50), adapted to sheathe the lead screw (13), and comprising:
    an outer socket (51), comprising a cavity (511), at least one stop portion (512) disposed in the cavity (511), and a first accommodation portion (513) disposed on a side edge of the stop portion (512);
    an inner socket (53), installed in the outer socket (51), and comprising at least one raised portion (531) extended from an outer peripheral surface thereof, and a second accommodation portion (532) disposed on a side edge of the raised portion (531); and
    a centrifugal assembly (55), comprising at least one centrifugal block (551) and at least one elastic element (555), and the centrifugal block (551) movably installed between the first accommodation portion (513) and the second accommodation portion (532);
    wherein, the lead screw (13) is configured to drive the inner socket (53) and the centrifugal assembly (55) to rotate, and when a centrifugal force of the centrifugal block (551) is smaller than an elastic force of the elastic element (555), the centrifugal block (551) is limited in the second accommodation portion (532) by the elastic element (555), and the inner socket (53) rotates in the outer socket (51); and
    when the centrifugal force of the centrifugal block (551) is greater than the elastic force of the elastic element (555), the centrifugal block (551) is configured to move into the first accommodation portion (513) and clamped by the raised portion (531) and the stop portion (512), and the inner socket (53) is linked with the outer socket (51).

2. The linear actuator (1) according to claim 1, further comprising: a retarding spring (60) binding the outer socket (51) and comprising a positioning arm (61), and the actuation body (10) further comprising a casing (11), and the positioning arm (61) fixed to the casing (11).

3. The linear actuator (1) according to claim 1, wherein the stop portion (512) and the raised portion (531) are multiple in number, and each of the stop portions (512) is a stop block, and each of the raised portions (531) is a rib.

4. The linear actuator (1) according to claim 3, wherein the centrifugal assembly (55) is multiple in number, and the centrifugal safety device (50) further comprises a front cap (57) and a rear cap (59) covering two ends of the inner socket (53) and two ends of each centrifugal assembly (55) respectively.

5. The linear actuator (1) according to claim 4, wherein the rear cap (59) comprises a flat attaching surface (591) disposed therein and abutting against an end of each elastic element (555).

6. The linear actuator (1) according to claim 5, wherein the centrifugal block (551) comprises a cross-section substantially in a stepped shape, and a thickness of each of two side ends of the centrifugal block (551) is smaller than a thickness of a middle section of the centrifugal block (551), and the centrifugal block (551) comprises a blind hole (555) respectively disposed on the two side ends, and the elastic element (555) comprises a compression spring, and one end of the compression spring is accommodated in the blind hole (555).

7. The linear actuator (1) according to claim 4, wherein each of the raised portions (531) comprises a snap slot (534), and a snap bar (592) is extended from inside of the rear cap (59) and embedded in the snap slot (534).

8. The linear actuator (1) according to claim 4, further comprising: a gasket adapted to sheathe the lead screw (13) and disposed on a side edge of the front cap (57).

9. The linear actuator (1) according to claim 3, wherein each of the raised portions (531) comprises a plurality of radial embedding grooves (535), and the centrifugal assembly (55B) is multiple in number, and each of the centrifugal blocks (551B) comprises a plurality of another radial embedding grooves (553), and the elastic element (555B) comprises a C-ring, and the C-rings is engaged with one of the radial embedding grooves (535) and one of the another radial embedding grooves (553).

10. The linear actuator (1) according to claim 9, further comprising: a retarding spring (60), and a convex ring (515) expanded and extended on an end of the outer socket (51B), and the retarding spring (60) binding the outer socket (51B) and attached to a side edge of the convex ring (515).

11. The linear actuator (1) according to claim 10, wherein the retarding spring (60) comprises a positioning arm (61), and the actuation body (10) further comprises a casing (11), and the positioning arm (61) is fixed to the casing (11).

12. The linear actuator (1) according to claim 1, wherein the outer socket (51) comprises a plurality of positioning bars (514) extended from an outer peripheral surface thereof, and the outer tube (14) comprises a plurality of positioning slots (141) for the positioning bars (514) to be embedded and fixed.

13. A centrifugal safety device (50), comprising:
an outer socket (51), comprising a cavity (511), at least one stop portion (512) disposed in the cavity (511), and a first accommodation portion (513) disposed on a side edge of the stop portion (512);
an inner socket (53), disposed in the outer socket (51), and comprising at least one raised portion (531) extended from an outer peripheral surface of the inner socket (53), and a second accommodation portion (532) disposed on a side edge of the raised portion (531); and
a centrifugal assembly (55), comprising at least one centrifugal block (551) and at least one elastic element (555), and the centrifugal block (551) movably disposed between the first accommodation portion (513) and the second accommodation portion (532);
wherein, the inner socket (53) is configured to drive the centrifugal assembly (55) to rotate, and when a centrifugal force of the centrifugal block (551) is a smaller than an elastic force of the elastic element (555), the centrifugal block (551) is limited in the second accommodation portion (532) by the elastic element (555), and the inner socket (53) rotates in the outer socket (51);
when the centrifugal force of the centrifugal block (551) is greater than the elastic force of the elastic element (555), the centrifugal block (551) is configured to move into the first accommodation portion (513) and clamped by the raised portion (531) and the stop portion (512), and the inner socket (53) and the outer socket (51) are linked with each other.

14. The centrifugal safety device (50) according to claim 13, wherein the stop portion (512) and the raised portion (531) are multiple in number, and each of the stop portions (512) is a stop block, and each of the raised portions (531) is a rib.

15. The centrifugal safety device (50) according to claim 14, wherein the centrifugal assembly (55) are multiple in number and the centrifugal safety device (50) further comprises a front cap (57) and a rear cap (59) covering two ends of the inner socket (53) and two ends of each of the centrifugal assemblies (55) respectively.

16. The centrifugal safety device (50) according to claim 15, wherein the rear cap (59) comprises a flat attaching surface (591) disposed therein and abutting against an end of each of the elastic elements (555).

17. The centrifugal safety device (50) according to claim 16, wherein the centrifugal block (551) comprises a cross-section substantially in a stepped shape, and a thickness of each of two side ends of the centrifugal block (551) is smaller than a thickness of a middle section of the centrifugal block (551), and the centrifugal block (551) comprises a blind hole (555) disposed on the two side ends separately, and the elastic element (555) comprises a compression spring, and one end of the compression springs is accommodated in the blind hole (555).

18. The centrifugal safety device (50) according to claim 15, wherein each of the raised portions (531) comprises a snap slot (534), and a snap bar (592) is extended from inside of the rear cap (59) and embedded in the snap slot (534).

19. The centrifugal safety device (50B) according to claim 14, wherein each of the raised portions (531) comprises a plurality of radial embedding grooves (535), and the centrifugal assembly (55) is multiple in number, and each of the centrifugal blocks (551) comprises a plurality of another radial embedding grooves (535), and the elastic element (555B) comprises a C-ring, and the C-rings is engaged with one of the radial embedding grooves (553) and one of the another radial embedding grooves (553).

20. The centrifugal safety device (50) according to claim 13, further comprising: a retarding spring (60) binding the outer socket (51).

* * * * *